United States Patent [19]

Furumura et al.

[11] E Patent Number: Re. 32,573

[45] Reissued Date of Patent: Jan. 5, 1988

[54] PROCESS FOR PRODUCING A FERROFLUID, AND A COMPOSITION THEREOF

[75] Inventors: Kyozaburo Furumura, Ninomiya; Shigeki Matsunaga, Tokyo, both of Japan

[73] Assignee: Nippon Seiko Kabushiki Kaisha, Tokyo, Japan

[21] Appl. No.: 920,226

[22] Filed: Oct. 16, 1986

Related U.S. Patent Documents

Reissue of:

[64] Patent No.: 4,485,024
Issued: Nov. 27, 1984
Appl. No.: 478,876
Filed: Mar. 25, 1983

[30] Foreign Application Priority Data

Apr. 7, 1982 [JP] Japan ..... 57-56654
Dec. 8, 1982 [JP] Japan ..... 57-214015

[51] Int. Cl.[4] ..... H01F 1/25; C10M 3/00

[52] U.S. Cl. ..... 252/62.52; 252/62.51; 252/62.56

[58] Field of Search ..... 252/62.52, 62.51, 62.56

[56] References Cited

U.S. PATENT DOCUMENTS

| | | | |
|---|---|---|---|
| 3,700,595 | 10/1972 | Kaiser | 252/62.51 |
| 3,843,540 | 10/1974 | Reimers | 252/62.51 |
| 3,917,538 | 11/1975 | Rosenweig | 252/62.51 |
| 4,094,804 | 6/1978 | Shimoiizaka | 252/62.51 |
| 4,315,827 | 2/1982 | Bottenberg | 252/62.51 |
| 4,430,239 | 2/1984 | Wyman | 252/62.51 |

*Primary Examiner*—Arthur P. Demers
*Attorney, Agent, or Firm*—Louis E. Marn

[57] ABSTRACT

The invention relates to a process for producing a ferrofluid, and a composition thereof. More particularly, fine particles of the ferromagnetic materials such as magnetite, ferrite, iron, cobalt alloy, etc. are dispersed stably and uniformly in one dispersing medium selected out of an oil group, an ester group or an ether group, whereby a ferrofluid composition having a high magnetizing capacity is produced effectively.

13 Claims, 2 Drawing Figures

Molecular-weight distribution of a poly-α-olefin oil by viscosity grade.

Effect of an oxidation inhibitor upon a poly-α-olefin oil.

PROCESS FOR PRODUCING A FERROFLUID, AND A COMPOSITION THEREOF

Matter enclosed in heavy brackets [ ] appears in the original patent but forms no part of this reissue specification; matter printed in italics indicates the additions made by reissue.

BACKGROUND OF THE INVENTION

This invention relates to a process for producing a ferrofluid, and a composition thereof. More particularly, fine particles of the ferromagnetic materials such as magnetite, ferrite, iron, cobalt alloy, etc. are dispersed stably in one dispersing medium selected out of an oil group, an ester group or an ether group, whereby a ferrofluid composition having a high magnetizing capacity is produced effectively.

Generally, the ferrofluid is a colloidal solution, in which such ferromagnetic fine particles are dispersed stably and uniformly in a preferred dispersing medium. Such colloidal solution is neither coalesced nor precipitated under the influence of magnetic force, gravity, centrifugal force, etc., so that the ferromagnetic fine particles are not separated from the colloidal solution. Thus, the ferrofluid displays a strong magnetic force responsive to magnetic field.

In recent years, such ferrofluid has been used as a sealing agent, a damping agent, a lubricant or the like and various industrial circles pay high attention to its unique properties.

Various dispersing mediums can be used for the ferrofluid. When it is used for a lubricant or a sealing agent in bearing means, it must have good lubricating property, high heat resistance, low volatility, good chemical stability, etc. From this point of view, the oil group such as a mineral oil, a synthetic oil, etc., the ester group and the ether group are most suitable as dispersing mediums for such ferrofluid. In this case, each surface of the ferromagnetic fine particles is required to have a lipophilic nature to be well-adapted to the dispersing medium.

When the ferrofluid is used as a sealing agent, the stronger magnetic force thereof causes the stronger sealing force. Further, when it is used as a lubricant, the stronger magnetic force thereof is capable of coping with the mechanical agitation caused by an axial rotation of a rotary shaft, thereby the ferrofluid is prevented from splashing or spoiling the surrounding.

The strength of magnetization is dependent upon the concentration of the ferromagnetic fine particles contained in the ferrofluid. Accordingly, it is a very important task to obtain the ferrofluid having a higher concentration thereof. However, if the concentration is higher and higher, a gap between adjacent particles becomes slighter and coalesced easily. Accordingly, a highly concentrated ferrofluid cannot be prepared without realizing the optimum dispersion of the ferromagnetic fine particles in a desired dispersing medium.

If many fine particles of large diameter that are coalesced easily are contained in the dispersing medium or if a surface-active agent is adsorbed insufficiently on each surface of the fine particles, it becomes impossible to obtain a highly concentrated ferrofluid.

We will now refer to the conventional process for producing a ferrofluid, which is disclosed in Japanese Unexamined Patent Publication No. 44579/[1967] *1976*. This process also uses any one out of the oil group, the ester group or the ether group as a dispersing medium. This conventional technique may be called a dispersion method using two molecular adsorption layers.

First of all, an aqueous suspension of colloidal ferromagnetic oxide is obtained by the wet method. According to the wet method, alkali is added to an acid solution including ferrous ion and ferric ion respectively at the ratio of 1:2, and the thus obtained mixture has more than about pH 9. The mixture is matured at a suitable temperature, so that a magnetite colloidal solution is obtained. To make lipophilic each surface of the collaidal particles obtained thus, the surface-active agent containing an unsaturated fatty acid or its salt as a main material is added to the solution. Then, an excessive quantity of the surface-active agent is added to the solution in order to seal completely each surface of the colloidal particles, thereby two molecular adsorption layers are formed. It is generally known that a first monomolecular adsorption layer of the surface-active agent ion displays a lipophilic nature on its surface, but a second monomolecular adsorption layer displays a hydrophilic nature on its surface. Under those circumstances, it is difficult to separate the liquid phase from the solid phase. Then, by adjusting pH of the solution, the ferromagnetic fine particles are rapidly coalesced and settled, thereby separation of the solid from the liquid phase becomes difficult. Subsequently, by filtering and purifying a sediment, the surface-active agent ions of the second molecular layer are removed and the surfaces of the fine particles become lipophilic. Then, they are treated with dehydration and drying. Finally, those dried fine particles are dispersed in a desired dispersing medium.

Although such a dispersing method is advantageous in the point that the hydrophilic colloidal particles having a difficult filterability can be coalesced rapidly by adjusting pH, it has the following disadvantages:

(1) The ferromagnetic particles becomes dispersoid of the obtained ferrofluid, but there are many larger particles in diameter. Accordingly, when those ferromagnetic particles are dispersed in a preferred dispersing medium, the larger particles are precipitated, so that it is not possible to obtain a highly-concentrated ferrofluid having a high magnetizing capacity.

(2) Because the surface-active agent is added excessively more than the quantity necessary for forming a monomolecular layer, an oily unsaturated fatty acid is formed and adsorbs the surfaces of the particles.

Finally, the particles adsorbed by the unsaturated fatty acid are removed by a later process. Accordingly, this conventional method is inefficient.

(3) The surface-active agent is added to the aqueous suspension having an alkali pH and more than an equipotential point of the colloidal particles, under which condition the surfaces of the colloidal particles are of a negative charge. Thus, for example, the surface-active agent such as unsaturated fatty acid having a negative charge in the aqueous solution is unsusceptible to adsorb the particles. Accordingly, some unstable particles are susceptible to arise in the dispersing medium.

BRIEF SUMMARY OF THE INVENTION

Accordingly, it is a general object of this invention to provide a process for producing a ferrofluid, and a ferrofluid thereof, wherein the ferrofluid having a highly concentrated ferromagnetic fine particles as well as a high magnetizing force can be obtained effectively.

According to one basic aspect of this invention, the process for producing a ferrofluid comprises: a step of adding a surface-active agent and an organic solvent having a low boiling point to ferromagnetic fine particles and coating each surface of said fine particles with the surface-active agent; a step of dispersing the thus coated fine particles in said organic solvent, thereby preparing an intermediate; a step of separating some ferromagnetic fine particles having a bad dispersion property from said intermediate, subsequently mixing one dispersing medium selected out of an oil group, an ester group or an ether group with the intermediate, thereby preparing a mixture thereof; and a step of heating said mixture and evaporating said organic solvent.

Preferably, the proces for producing a ferrofluid comprising: a step of adding a surface-active agent and an organic solvent having a low boiling point to ferromagnetic fine particles and coating each surface of said fine particles with said surface-active agent; a step of dispersing the thus coated fine particles in said organic solvent, thereby preparing an intermediate; a step of separating some ferromagnetic fine particles having a bad dispersion property from said intermediate, subsequently adding a poly-α-olefin oil, a saturated fatty acid having more than 18 carbon atoms and an oxidation inhibitor to said intermediate, thereby preparing a mixture thereof; and a step of heating said mixture and evaporating said organic solvent.

Further, the process for producing a ferrofluid comprising: a step of adding a surface-active agent and an organic solvent having a low boiling point to ferromagnetic fine particles and coating each surface of said fine particles with said surface-active agent; a step of dispersing the thus coated fine particles in said organic solvent, thereby preparing an intermediate; a step of separating some ferromagnetic fine particles having a bad dispsersion property from said intermediate, subsequently heating said intermediate and evaporating said organic solvent; and a step of adding a poly-α-olefin oil, a saturated fatty acid having more than 18 carbon atoms and an oxidation inhibitor to said ferromagnetic fine particles obtained by the aforesaid steps.

Still further, this invention based on the aforesaid processes provides a ferrofluid composition comprising: a poly-α-olefin oil having an oligomer of 25 to 45 carbon atoms as a main ingredient; ferromagnetic fine particles dispersed in the poly-α-olefin oil by 1 to 20 volume percent, each fine particle having a particle diameter of from 20 to 500 Å; a first surface-active agent which is an unsaturated fatty acid having more than 10 carbon atoms and adsorpted on the ferromagnetic fine particles; a second surface-active agent which is a saturated fatty acid having more than 18 carbon atoms; and an oxidation inhibitor of from 0.1 to 10 weight percent of the poly-α-olefin oil.

BRIEF DESCRIPTION OF THE ACCOMPANYING DRAWINGS

DETAILED DESCRIPTION OF THE INVENTION

Figure 1:
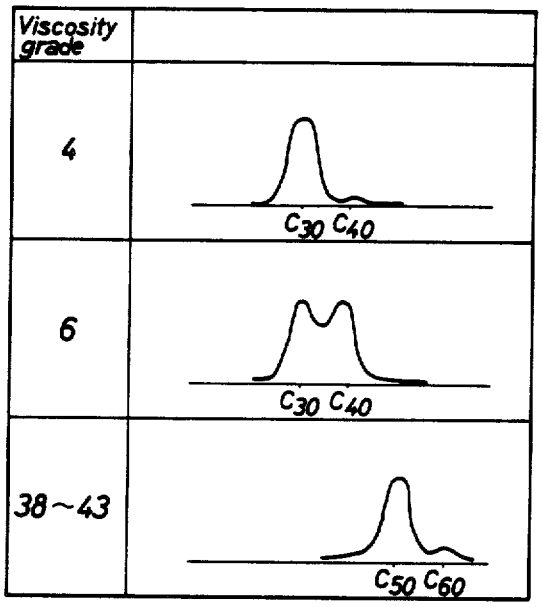
FIG. 1 is a graph showing a molecular-weight distribution of a poly-α-olefin oil by viscosity grade.

The ferromagnetic fine particles to be used in this invention are the magnetite colloid which is obtained by the wet method. The magnetite colloid in which magnetite powders are ball milled in water or organic solvent may be obtained by the wet ball milling method.

When the ferromagnetic fine particles are obtained by the wet milling method, a preferred amount of the ferromagnetic powders are dispersed in an organic solvent other than water. And, a certain amount of surface-active agent capable of forming the aforesaid monomolecular layer is added to the ferromagnetic powders as obtained above, and subsequently a mixture thereof may be milled more than a few hours in a ball mill. In such a ferrofluid based on the organic solvent, the yield of the produced colloidal fine particles is favorable because no oily matter is formed on the surfaces of the fine particles.

Further, it is also optional to use not only the magnetite colloid, but also other various ferromagnetic oxidants such as manganese ferrite, nickel ferrite, cobalt ferrite or a composite ferrite made of zinc and any one of the aforegoing substances, barium ferrite or the like. Still further, desired ferromagnetic particles may be obtained by the dry method.

Each particle diameter of the ferromagnetic particles to be used in this invention is preferably 20 to 500 Å. For example, the lattice constant of the magnetite is about 8 Å unit lattice and is of a reverse spinel structure. Its crystallization consists of more than several unit lattices and the particle diameter of at least more than 20 Å is required. Referring to an upper margin of the particle diameter, the parameter [γ] λ indicated by $[\gamma]\lambda = Ms^2V^2/d^3kT$ becomes important in view of stability of the ferrofluid as a suspension for the ferrofluid, wherein Ms is a saturated magnetization, V: a particle volume, d: particle diameter k: Boltzman constant and T: absolute temperature.

It is generally said that the marginal rate [γ] λ of preventing coalescense between individual particles against an attraction therebetween as well as against an attraction between respective dipoles is $10^3$. Provided that the marginal rate α is $10^2$ and the saturated magnetization is 400 G in view of safety, the upper limit of the desired particle diameter is 500 Å. Preferably, it is about 100 Å.

According to the aforegoing equation, when $Ms = 400$ G, $[\gamma]\lambda = 1$, wherein the ferromagnetic fine particles dispered are stationary for a long time in the dispersing medium and are never settled.

The concentration of the ferromagnetic fine particles in the ferrofluid is 1 to 20 volume percent, preferably 2 to 10 volume percent.

We refer to a very typical ferrofluid in which magnetite particles of which each surface is formed by a surface-active agent layer based on oleic acid are dispersed in kerosine. It is known that the viscosity of this kind of ferrofluid is rapidly increased when it passes the level of 0.5 g/ml in particle concentration. When considering the length of the oleic acid particles having coated the surface of the particles, the concentration of the ferromagnetic fine particles is about 20% or no more than 20% in order to avoid a large increase of viscosity.

To obtain a desired magnetization of the aforesaid ferrofluid, it is known that the concentration of the ferromagnetic fine particles is no less than 0.05 g/ml. Then, the concentration by volume percent is more than about 1 percent. However, when the poly-α-olefin oil based ferrofluid is used as a sealing agent, the most desirable concentration of the fine particles is from 2 to 10 volume percent of the ferrofluid.

The process for producing the ferrofluid according to this invention includes a step of producing an intermediate in which a first surface-active agent and an organic solvent having a low boiling point are added to the aforesaid ferromagnetic particles, and the ferromagnetic particles each of which surface is coated by the first surface-active agent are dispersed in the organic solvent.

The first surface-active agent may have at least one polar group or more composed of a carboxyl group (—COOH), a hydroxy group (—OH), a sulfo group (—$SO_3H$), etc. and have more than 10 carbon atoms. The first surface-active agent having less than 10 carbon atoms is not favorable in a dispersing condition of the fine particles. Such first surface-active agent may be a sodium salt or a potassium salt of the unsaturated fatty acids such as oleic acid ion, linolenic acid ion, erucic ion, etc., or N-(1,2-dicarboxylethyl) or N-stearilsulfosuccinate or the like.

For example, when the ferromagnetic fine particles are obtained by the wet method as mentioned previously, the first surface-active agent must be added under the condition that pH of the suspension is set to less than an equipotential point of colloidal particles by adding acid thereto.

In case the colloidal particles are iron oxide, pH is preferably no more than 7. Thus, each surface of the colloidal surfaces becomes a positive charge and the surface-active agent ion is easily adsorptive. In addition, the quantity of the surface-active agent may be the quantity capable of forming a monomolecular layer on the surfaces of the colloidal ferromagnetic fine particles in order to prevent from producing an oily matter due to excessive addition of the surface-active agent or producing a hydrophilic colloid due to formation of the two molecular layers.

Of course, the ferromagnetic fine particles may be obtained by the wet milling method as described previously.

A procedure of preparing the intermediate which is one step of the process for producing a ferrofluid will now be described.

The hydrophobic (i.e. lipophilic) fine particles having adsorbed ions of the surface-active agent upon their surfaces are dispersed in a suspension and the organic solvent is added thereto.

Subsequently, the ferromagnetic fine particles therein are shifted to the organic solvent through agitation. Thus, the intermediate in which the ferromagnetic particles are dispersed in the organic solvent can be obtained.

As another example, firstly a suspension is prepared by adding an organic solvent having a low boiling point to the ferromagnetic particles. Subsequently, the surface-active agent is added to the suspension, thereby the intermediate is obtained. Otherwise, it may be obtained by adding a mixing solution of the surface-active agent and the low boiling point having organic solvent to the ferromagnetic particles.

Further, a water content separated from the ferromagnetic particles is discharged as waste water, and a little water content remaining in the organic solvent can be removed by heating and boiling.

Further, when the suspension is of the water phase, it is not always necessary to add the organic solvent. In other words, after the hydrophobic ferromagnetic fine particles have been obtained by purifying and drying the aqueous suspension, it is possible to add an organic solvent to such ferromagnetic fine particles and disperse the latter in the former. Of course, the step of preparing the intermediate is not always limited to the aforementioned procedure.

A step of separating some ferromagnetic fine particles having a bad dispersion property from the intermediate will now be described.

Such fine particles of the bad dispersion property are removed by a centrifugal separator of e.g. 5,000 to 8,000 G. After that, a desired dispersing medium selected out of the oil group, the ester group or the ether group is added to the intermediate, and a full agitation is conducted, thereby producing a mixture.

The step of separating some fine particles of the bad dispersion property from the intermediate is carried out twice. The first selection is made when dispersing the ferromagnetic fine particles in the organic solvent. The second selection is the case that such inferior fine particles are separated by a centrifugal separator.

By repeating such steps, the concentration of the ferromagnetic fine particles in the intermediate product is reduced considerably, but the intermediate product is volatile easily. By adding repeatedly the fine particles to any one of the oil, the ester group and the ether group, a large quantity of ferromagnetic fine particles can be dispersed in the ferrofluid.

If any one of the oil, the ester group and the ether group is added to the ferromagnetic fine particles without making use of the intermediate, the ferrofluid is required to have low volatility. Thus, evaporation by heating will be difficult.

When increasing the concentration of the ferromagnetic fine particles by reducing the quantity of the dispersing medium selected out of the oil group, the ester group or the ether group, some fine particles of a bad dispersion property are always involved in the dispersing medium. Therefore, the concentration of the fine particles of a good dispersion property becomes lesser.

In addition, some fine particles of the bad dispersion property are separated and are settled together with the fine particles of the good dispersion property. Accordingly, a very large amount of sediments arise and the amount of the ferromagnetic particles in the dispersing medium is decreased remarkably. Accordingly, it is difficult to obtain the ferrofluid having a desired concentration of the ferromagnetic fine particles.

Preferably, the organic solvent has a small polarity more or less near to any one of the oil, ester group and ether group and has a low boiling point. For example, it may be a paraffin hydrocarbon such as heptane, hexane, pentane, octane, dodecane, etc., an aromatic hydrocarbon such as cyclohexane, toulene, etc., kerosine or the like.

We refer to a second surface-active agent. Basically, it is soluble to any one of the oil, the ester group and the ether group. More specifically, it may be a nonionic surface-active agent, e.g. polyoxyethylenonylphenolether of which hydrophilic-lipophilic balance (HLB) is from 1 to 5. Addition of the second surface-active agent is not always necessary. However, in case the first surface-active agent is not fully adsorbed on the surfaces of some ferromagnetic particles, the nonionic surface-active agent is adsorbed on the surfaces thereof, thereby displaying the effect of increasing the lipophilic nature and decreasing apparent viscosity.

The nonionic surface-active agent may be an ether group, an alkylphenol group, an ester group, a sorbitan ester group, a multivalent alcohol or a mixture of the above groups. However, when the poly-α-olefin oil is used as a dispersing medium in order to disperse better the ferromagnetic fine particles therein, the second surface-active agent is emulsifiable or soluble with the poly-α-olefin oil, and may be a saturated fatty acid having more than 18 carbon atoms. Thus, in case of the ferrofluid in which the poly-α-olefin oil is used as a dispersing medium, to employ a fatty carboxylic acid as a surface-active agent rather than a poly fatty acid glycerin ester causes to increase the concentration of the ferromagnetic powders. The result is shown in Table 1.

TABLE 1

Addition of the second surface-active agent in the ferrofluid in which the poly-α-olefin oil is used as a dispersing medium, and its relationship with saturated magnetization (Gauss)

| Second surface-active agent | Saturated magnetization |
|---|---|
| None | 90 |
| Nonionic surface-active agent (Polyfatty acid glycerin ester) | 110 |
| Fatty carboxylic acid (Melissic acid) | 120 |

Note:
The poly-α-olefin oil is P-60 type manufactured by Bray Oil Corporation.

As seen above, in case the fatty carboxylic acid is used, the saturated magnetization becomes higher.

We now refer to the poly-α-olefin oil.

Generally, it is an olygomer made of a low grade α-olefin of which polymerization degree is controlled. It has a low volatility and a low viscosity as well, and is expressed by the following chemical formula.

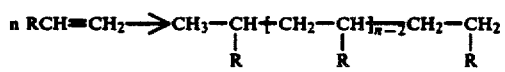

R: $C_mH_{2m}+1$

The poly-α-olefin oil is synthesized by lubricating liquids having various grades of viscosity. The viscosity grade depends on the quantity of n of the above formula. (Normally, the symbol n, e.g. monomer, trimer, tetramer, etc. is used. It means n times of low grade α-olefin prior to polymerization.) The lubricating liquid in the poly-α-olefin oil consists of from trimer to sexmer. Table 2 shows the viscosity grade of the poly-α-olefin oil and their ingredients. Since poly-α-olefin oil and first and second surfactants are used, the ferrofluids of the present invention exhibit properties of stability of extended times at 80° C. Additionally, such high degree of stability is very effective for magnetic disc requiring high dust-proofing property.

TABLE 2

Poly-α-olefin oils by viscosity grade and their ingredients

| Viscosity grade (cst) at 98.9° C. | Ingredients | |
|---|---|---|
| 4 | Main ingredient: | Trimer $C_{30}$ small quantity of tetramer $C_{40}$ |
| 5 | By mixing poly-α-olefin oils having the viscosity grade Nos. 4 and 6 respectively, the poly-α-olefin oil of the viscosity grade No. 5 is obtained. | |
| 6 | Main ingredients: | Trimer $C_{30}$, Tetramer $C_{40}$, small quantity of quintomer |

TABLE 2-continued

Poly-α-olefin oils by viscosity grade and their ingredients

| Viscosity grade (cst) at 98.9° C. | Ingredients | |
|---|---|---|
| 38 to 43 | Main ingredient: | Quintomer $C_{50}$, small quantity of sexmer $C_{60}$ |

Note:
Refer to FIG. 1. The quantity of carbon atoms is a value of oligomerization of decene-1[$CH_3(CH_2)_7CH{=}CH_2$]

When the ferrofluid is used as a sealing agent for a magnetic disc, we have found that the poly-α-olefin oil having the viscosity grade No. 6 as listed above has excellent properties as a dispersing medium for obtaining such ferrofluid. On the other hand, when the poly-α-olefin oils having the viscosity grade Nos. 4 and 5 are used as the dispersing medium, evaporation of the ferrofluid becomes larger. Further, when the poly-α-olefin oils having the viscosity grade Nos. 38 to 43 are used, the ferrofluid may cause high torque and high temperature in rotary means.

As seen in Table 2, the poly-α-olefin oil of the viscosity grade No. 6 comprises mainly a trimer having 30 carbon atoms and a tetramer having 40 carbon atoms. The range of the carbon atoms of the poly-α-olefin oil to be used for this invention is from 25 to 45 carbon atoms. Preferably, it comprises mainly a tetramer having 40 carbon atoms.

When the poly-α-olefin oil is used as a dispersing medium, the carboxylic group of the second surfaceactive agent has a property to adsorb strongly each surface of the ferromagnetic particles. Accordingly, unless some fine particles are fully coated by the first surface-active agent, the carboxylic group of the second surface-active agent is adsorbed on the insufficiently coated surfaces of the fine particles, whereby the enhance the lipophilic nature.

As described above, the range of the carbon atoms of the poly-α-olefin oil according to this invention is from 25 to 45. Therefore, a higher number of the carbon atoms of the surface-active agent is better. Preferably, it has more than 18 carbon atoms.

The saturated fatty acid is superior to the unsaturated fatty acid in view of thermal stability, because the former has no double bond.

Figure 2:
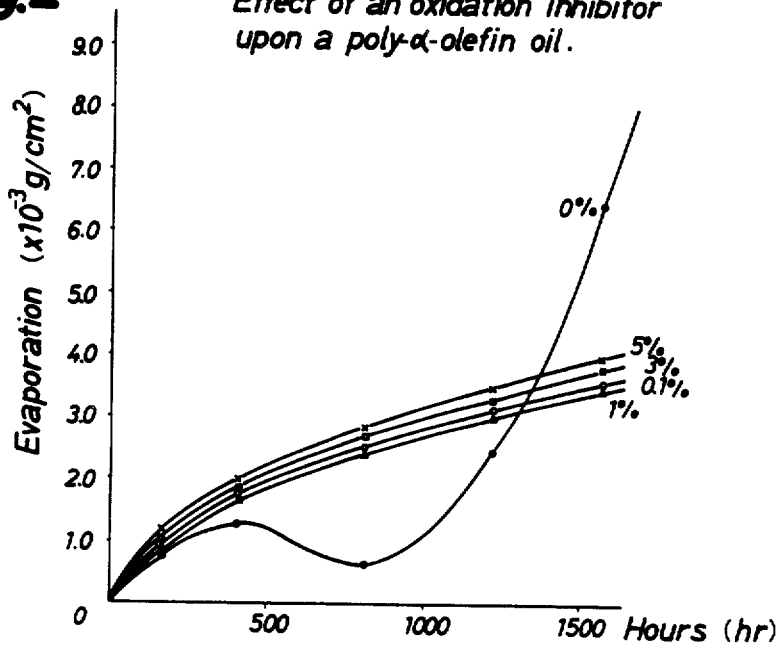
FIG. 2 is a graph showing the effect of an oxidation inhibitor upon a poly-α-olefin oil.

The oxidation inhibitor may be e.g. a phenol group, an amine group, a thiophosphate or the like that is used generally for inhibiting oxidation of hydrocarbon. To obtain a further effect, a few kinds of oxidation inhibitors may also be added. As seen in FIG. 2, the addition quantity of the oxidation inhibitor may be from 0.1 to 10 weight percent of the poly-α-olefin oil. If the weight percent is more than 10 percent, the oxidation inhibitor contributes to oxidative reaction of hydrocarbon.

FIG. 2 shows the effect of an oxidation inhibitor upon a poly-α-olefin oil, wherein the former is 4,4'-methylenebis-2,6-ditert-butylphenol and the latter is P-60 type manufactured by Bray Oil Corporation. The sample was treated at a temperature of 80° C. The degree of oxidation of the poly-α-olefin oil is indicated by vaporation quantity thereof.

Through the aforesaid process, a mixture is obtained, and subsequently it is heated in atmosphere or vacuum. And, the organic solvent having a low boiling point is evaporated. During this evaporation process, the ferromagnetic fine particles dispersed in the organic solvent is transferred to any one of the oil group, the ester group or the ether group, thereby a preferred ferrofluid is obtained.

The polarity of the oil group, the ester group or the ether group is relatively similar to that of the organic solvent, so that the ferrofluid fine particles are transferred very smoothly during the evaporation process of the organic solvent. Even if the density of the fine particles in any one of the oil group, the ester group or the ether group is higher, they can be dispersed stably and uniformly therein.

Further, after some fine particles having a bad dispersion property have been separated by a centrifugal separator of 5,000 to 8,000 G, the remainder of the fine particles is again mixed with a newly produced intermediate comprising the organic solvent having a low boiling point, whereby the organic solvent is evaporated from the mixture. By repeating such process, it is possible to obtain a ferrofluid containing very highly concentrated fine particles of a high dispersion property.

The aforementioned method is the wet one. Of course, it is available to obtain the ferromagnetic fine particles by the dry method.

When the poly-α-olefin oil is used as a dispersing medium, some ferromagnetic particles having a bad dispersion property are separated from the intermediate. Subsequently, the intermediate may be heated and the organic solvent having a low boiling point may be evaporated. After this procedure, the poly-α-olefin oil, the second surface-active agent and the oxidation inhibitor are added to the ferromagnetic fine particles.

Still further, when the poly-α-olefin oil is used as a dispersing medium, the ferromagnetic fine particles are to be lipophilic and are dispersed in the organic solvent having a low boiling point, thereby the intermediate is obtained. Subsequently, the poly-α-olefin oil, the second surface-active agent and the oxidation inhibitor are added to the intermediate. Thus, a mixture thereof is prepared and evaporated. Alternatively, the intermediate may be heated and the above three materials may be added thereto. Accordingly, a low boiling content of the intermediate is removed, thereby highly concentrated fine particles are dispersed stably in the ferrofluid.

Preferred examples of this invention will now be described hereinafter.

EXAMPLE 1:

Preparation of the ferrofluid by using polybutene (Nisseki LV-25E) as a dispersing medium and magnetite particles as ferromagnetic substance Add an aqueous solution of 6N NaOH to 1 liter of aqueous solution of each 1 mol/1 of ferrous sulfate and ferric sulfate until the pH value reaches 11 or above and mature the solution at 60° C. for 30 minutes to obtain a magnetite colloid. Subsequently, keep the magnetite suspension at 60° C., add to it a solution of 3N HCL and adjust the pH value to 4 to 5. Stir the solution thus obtained for 30 minutes after adding 20 g of sodium oleate to the solution. Keep the stirred solution stationary, coalesce magnetite powders, discharge a supernatant liquid and add water. Repeating water washing several times, remove electrolytes therefrom.

Add a small quantity of HCL to the liquid when the liquid shows a state of dispersion with the rise in pH value. Thereafter, transfer the liquid to a separate funnel, add hexane to the liquid, shake the funnel well and separate water from hexane after letting the liquid settle down. Separate centrifugally the hexane, on which magnetite particles are dispersed, under the centrifugal force of 8000 G for 20 minutes. Discharge an upper liquid, add to the remainder 30 cc of polybutene and 1 cc of nonionic surface-active agent of polyoxyethylenonylphenolether (HLB 7.5), and mix them. Keep the mixed liquid at 90° C. and evaporate organic solvent by the use of a rotary evaporator. After evaporation, the magnetite particles are dispersed in the polybutene. Separate the former from the latter under the centrifugal force of 8000 G for 60 minutes. By this procedure, some solid particles having a bad dispersion property were removed, and the remainder was a very stable ferrofluid.

EXAMPLE2:

Preparation of the ferrofluid by using dioctyl adipate [$C_4H_8(COOC_8H_{17})_2$] as a dispersing medium and magnetite particles The process for dispersing the magnetite particles into the hexane is the same as that described in Example 1.

Separate centrifugally the hexane liquid separated in a separating funnel under the centrifugal force of 8000 G for 20 minutes. Take out an upper liquid, evaporate the hexane and dry the magnetite particles by a vacuum thermostatic dryer.

After drying, take out 5 g of magnetite particles, add to it 25 cc of dioctyl adipate and 5 cc of nonionic surface-active agent of polyoxyethylenonylphenolether (HLB 12.8), and mix them. After mixing, re-heat in a vacuum the mixed liquid in order to completely remove a water content in the dispersing medium as well as a water content adsorbed on the magnetite particles.

After cooling, separate the mixed liquid under the centrifugal force of 8000 G for 60 minutes. By this procedure, some solid particles having a bad dispersion property were removed, and the remainder was a very stable ferrofluid.

EXAMPLE 3:

Preparation of a ferrofluid composition by using poly-α-olefin oil (P-60 of Bray Oil Corp.) as a dispersing medium, iso-stearic acid as a second surface-active agent, and magnetite particles Add an aqueous solution of 6N NaOH to 1 liter of another aqueous solution of each 1 mol/liter of ferrous sulfate and ferric sulfate until the pH value reaches 11 or above and mature the solution at 60° C. for 30 minutes to obtain a magnetite colloid. Keep the magnetite suspension at 60° C., add to it a solution of 3N HCL and adjust the pH value to 4 to 5. Subsequently, add sodium oleic acid and stir for 30 minutes. Let the mixture stationary and coalesce the magnetite particles. Then, discharge a supernatant liquid and add water. Repeating water washing several times, remove electrolytes. Add a small quantity of HCL to the liquid when the liquid shows a state of dispersion with the rise in pH value. Subsequently, filter this liquid and dehydrate the magnetite particles. Add hexane as organic solvent having a low boiling point to the magnetite particles and make separation of a well-mixed liquid for 20 minutes under a centrifugal force of 4000 G. Then, transfer the liquid to a funnel and separate the hexane from a water content. Subsequently, keep at 90° C. the hexane in which the magnetite particles are dispersed. After evaporation take out the magnetite particles remained in an evaporator, put them into a vacuum thermostatic dryer, keep this condition for one hour at 100° C. and dry completely the magnetite particles.

After drying, disperse again 2 g of the magnetite particles in the hexane. Then, add 5 cc of poly-α-olefin oil, 0.03 cc of isostearic acid as second surface-active agent, 0.05 g of 4,4'-metylene-bis-2,6-ditert-butylphenol as oxidation inhibitor. After mixing fully those substances, dry the hexane by a rotary evaporator. After evaporation, disperse the magnetite particles in the poly-α-olefin oil, and separate some solid particles having a bad dispersion property therefrom under a centrifugal force of 8000 G for 60 minutes. The reminder was a very stable ferrofluid.

EXAMPLE 4:

Preparation of a ferrofluid composition by using poly-α-olefin oil (P-60 of Bray Oil Corp.) as a dispersing medium, a melissic acid as a super-active agent and magnetite particles The procedure for preparing the magnetite, dispersing it to hexane, and drying its mixture is the same as that in Example 1.

After drying, take 2 g of the magnetite particles, disperse again in the hexane and add 5 cc of the poly-α-olefin oil, 0.03 g of the melissic acid and 0.05 g of the oxidation inhibitor as described in Example 1. After full mixing, the hexane is evaporated by a rotary evaporator. After evaporation, disperse the magnetite particles in the poly-α-olefin oil, and separate the former from the latter for 60 minutes under a centrifugal force of 8000 G. By this procedure, some solid particles having a bad dispersion were removed, and the remainder was a very stable ferrofluid.

What is claimed is:

1. A process for producing an improved ferrofluid, which comprises:

controlling pH of an aqueous suspension of ferromagnetic fine particles to less than an equipotential point;

adding a surface-active agent and an organic solvent having a low boiling point to said ferromagnetic fine particles to coat each surface of said fine particles with said surface-active agent;

dispersing said thus coated fine particles in said organic solvent to form an intermediate particulate material;

separating ferromagnetic fine particles of bad dispersion from said intermediate particulate material;

mixing a dispersing medium selected from the group of an oil group, an ester group or an ether group with said intermediate particulate material to form a mixture thereof; and heating said mixture to evaporate said organic solvent to form said improved ferrofluid.

2. The process for producing an improved ferrofluid as claimed in claim 1, wherein said intermediate particulate material is obtained by adding said surface-active agent to said ferromagnetic fine particles to coat each surface of said first particles with said surface-active agent prior to adding said organic solvent to said thus coated fine particles.

3. The process for producing an improved ferrofluid as claimed in claim 1, wherein said intermediate particulate material is obtained by adding said organic solvent having a low boiling point so said ferromagnetic fine particles to form a suspension and adding said surface-active agent to said suspension.

4. The process for producing an improved ferrofluid as claimed in claim 1, wherein said intermediate particulate material is obtained by adding a mixture of said surface-active agent and said organic agent to said ferromagnetic fine particles.

5. The process for producing an improved ferrofluid as claimed in claim 1, wherein said surface-active agent is a compound having more than 10 carbon atoms and one or more polar groups selected from the COOH group, OH group, $SO_3H$ group and is any one of an acid, salt or lactone of said compound.

6. The process for producing an improved novel ferrofluid as claimed in claim 1, wherein when said ferromagnetic fine particles are coated in an aqueous suspension, and wherein a quantity of said surface-active agent added to said aqueous suspension is limited to an enabling formation of a monomolecular layer on each surface of said fine particles.

7. The process for producing an improved ferrofluid as claimed in claim 1, wherein said dispersing medium selected is provided with a nonionic surface-active agent.

8. A process for producing an improved ferrofluid, which comprises:

(a) controlling pH of an aqueous suspension of ferromagnetic fine particles to less than an equipotential point;

(b) adding a surface-active agent and an organic solvent having a low boiling point to said ferromagnetic fine particles to coat each surface of said fine particles with said surface-active agent;

(c) dispersing said thus coated fine particles in said organic solvent to form an intermediate particulate material;

(d) separating ferromagnetic fine particles of bad dispersion from said intermediate particulate material:

(e) heating said intermediate particulate material to evaporate said organic solvent; and (f) subsequently adding a dispersion agent selected fron an oil group, an ester group or an ether group to said material of step (e) to from said improved ferrofluid.

9. A ferrofluid composition comprising:

a poly-α-olefin oil as a dispersing medium having an oligomer of from 25 to 45 carbon atoms;

ferromagnetic fine particles dispersed in said poly-α-olefin oil in an amount of from 1 to 20 volume percent, said ferromagnetic particles having a particle size of from 20 to 500 Å;

a first surface-active agent and a second surface-active agent each of which is adsorbed on said ferromagnetic fine particles; and an oxidation inhibitor in an amount of from 0.1 to 10 weight percent of said poly-α-olefin oil.

10. The ferrofluid composition as claimed in claim 9, wherein said first surface-active agent in an unsaturated fatty acid salt having more than [8] *10* carbon atoms.

11. The ferrofluid composition as claimed in claim 9, wherein said second surface-active agent is a saturated fatty acid [salt] having more than 18 carbon atoms.

12. A process for producing an improved ferrofluid, which comprises:

adding a first surface-active agent and an organic solvent having a low boiling point to ferromagnetic fine particles to coat each surface of said fine particles with said first surface-active agent;

dispersing said thus coated fine particles in said organic solvent to form an intermediate particulate material;

separating some ferromagnetic fine particles of bad dispersion from said intermediate particulate material;

adding a poly-α-olefin oil, a saturated fatty acid as a second surface-active agent having more than 18 carbon atoms and an oxidation inhibitor to said intermediate particulate material, to prepare a mixture thereof; and heating said mixture to evaporate organic solvent.

13. A process for producing an improved ferrofluid, which comprises:

(a) adding a first surface-active agent and an organic solvent having a low boiling point to ferromagnetic fine particles to coat each surface of said fine particles with said first surface-active agent;

(b) dispersing said thus coated fine particles in said organic solvent to form an intermediate particulate material;

(c) separating some ferrogmagnetic fine particles of bad dispersion from said intermediate particulate material;

[(d) adding a poly-α-olefin oil to said intermediate particulate material;]

[(e)] (*d*) heating said intermediate particulate material to evaporate organic solvent; and

[(f)] (*e*) adding a poly-α-olefin oil, a saturated fatty acid as a second surface-active agent having more than 18 carbon atoms and an oxidation inhibitor to the produce of step [(e)] (*d*).

* * * * *